3,498,919
PRESSURIZED FOAMING COMPOSITIONS
Irving Reich, Highland Park, and Earl H. Tiffany, Jr., Short Hills, N.J., assignors to Carter-Wallace, Inc., a corporation of Maryland
No Drawing. Filed Mar. 23, 1964, Ser. No. 354,135
Int. Cl. C11d 9/00, 9/26, 17/04
U.S. Cl. 252—90    4 Claims

ABSTRACT OF THE DISCLOSURE

Pressurized compositions which, upon release from the pressure container, form stable foams suitable for shaving. In addition to the propellant, the compositions comprise water, ethyl alcohol and one or more triethanolamine soaps of higher fatty acids.

---

The present invention relates to pressurized foaming compositions. More particularly, the invention relates to pressurized aerosol shaving lathers having improved properties.

Within recent years, the aerosol dispenser has received wide application in the dispensing of various materials in many fields. In the cosmetic field, many pressurized aerosol products, and particularly aerosol shaving lathers, have found wide commercial acceptance.

Since the introduction of aerosol shaving lathers, many variations thereof have been proposed. For example, various additives have been added to the basic formulations in order to impart various properties to the resulting foams such as, for example, improved germicidal and bactericidal activity, improved stability, and the like. However, but for the addition of such modifiers, the basic formulations of aerosol shaving compositions have remained unchanged and still consist essentially of aqueous solutions of water-soluble soaps in admixture with a liquefied normally-gaseous propellant.

It is an object of the invention to provide novel pressurized foaming compositions. It is another object of the invention to provide novel aerosol lathers capable of cleansing, disinfecting and stimulating the human skin. It is a further object of the invention to provide aerosol shaving compositions which form rich creamy lathers possessing the above properties. These and other objects will in part be obvious and in part become apparent to those skilled in the art in the light of the instant specification.

In its broad aspect, the invention is directed to a composition suitable for packaging in a pressure container and for forming a stable foam upon release from said container, said composition comprising an aqueous solution containing at least one triethanolamine salt of a higher fatty acid and from about 10 to about 30 weight percent, based on the weight of said solution, of ethyl alcohol; and a liquefied normally-gaseous propellant.

The surprising discovery has been made that the incorporation of substantial amounts of ethyl alcohol in compositions employing triethanolamine soaps leads to foams which are substantially firmer and richer than those obtained in the absence of the ethyl alcohol. The present discovery is especially surprising in view of the general knowledge that lower monohydric alcohols usually tend to destroy the stability of foams. This is generally true, and the addition of minor quantities of a lower monohydric alcohol, i.e., hexanol, is a common laboratory expedient when one wishes to destroy a foam.

The triethanolamine soap preferred in the practice of the present invention is the triethanolamine soap of commercial stearic acid. The product sold commercially as stearic acid is actually a mixture consisting primarily of stearic and palmitic acids. Therefore, as used herein and in the appended claims, the term "stearic acid" and "stearate" designate commercial stearic acid and salts thereof although chemically pure stearic acid would be equivalent for the purpose of the invention.

The amounts of triethanolamine stearate used in the compositions of the present invention range from about 6 to about 15 weight percent, based on the weight of the aqueous solution and, preferably, from about 7 to about 10 percent.

The beneficial effects of the present invention are achieved to an optimum degree when the compositions contain, in addition to triethanolamine stearate, minor amounts of the triethanolamine soap of coconut fatty acid (a mixture of myristic, lauric, palmitic and stearic acid). It has been found that, while the triethanolamine soap of coconut fatty acid will not produce acceptable foams when used alone in the presence of substantial amounts of ethyl alcohol, the addition of minor amounts of such soap to the present compositions results in foams which have superior cleansing and wetting action. In general, the amounts of triethanolamine coconut fatty acid soap can range from 0 to about 5 percent by weight based on the weight of the aqueous solution, and preferably, from about 1 to about 3 percent. Furthermore, it is desirable to maintain the content of triethanolamine stearate to the content of triethanolamine coconut fatty acid soap at a ratio above about 2 to 1 and, preferably, above about 4 to 1.

As stated above, the ethyl alcohol is used in the compositions of the invention in an amount of from about 10 to about 30 percent by weight, based on the weight of the aqueous solution. It has been surprisingly found that at concentrations above about 30 percent, the resulting foams are coarse and unstable and totally lack the richness and firmness characteristic of the foams of the present invention.

While not essential to the practice of the invention, it is preferred to add to the novel compositions from about 1 to about 10 weight percent, based on the weight of the aqueous solution, of an emollient to increase the stability and improve the "feel" of the resulting foam. It has been found that a preferred emollient is glycerol, used in amounts from about 2 to about 8 percent by weight, and, most preferably, in an amount of about 5 percent.

A number of additional ingredients which are compatible with the compositions of the present invention can be added thereto to enhance the effectiveness of the foams produced therefrom. Inasmuch as the substantially high ethyl alcohol content of the present compositions will result in foams which are especially useful as medicated foams, such medicating properties can be complemented by the incorporation of germicidal agents, such as hexachlorophene and the like, and skin-healing agents, such as allantoin and the like.

The liquefied normally-gaseous propellants suitable for use in the present invention include the relatively water-insoluble saturated hydrocarbons and partially or wholly chlorofluorinated hydrocarbons having vapor pressures in the range of from about 5 to about 300 pounds per square inch gauge at 70° F. The propellant can also be composed of a mixture of two or more such compounds. Suitable propellants include, for example, propane, isobutane, monochlorodifluoromethane, monofluorotrichloromethane, dichlorodifluoromethane, 1,2 - dichloro-1,1,2,2-tetrafluoroethane, and the like.

The amount of propellant in the pressurized composition is not critical. In general, the propellant need only be present in an amount sufficient to satisfactorily propel the aqueous composition from the pressurized container in the form of a coherent foam. The propellant should preferably yield an internal pressure of from about 30 to about 65 p.s.i.g. at a temperature of 70° F. A pressure in the range of from about 40 to about 55 p.s.i.g. is especially preferred. The desired pressure can be obtained by the selection of a single propellant having a suitable vapor pressure or by employing a combination of propellants in appropriate ratios, said factors being easily determined by mere experimentation by one skilled in the art. The amount of propellant to be used should be such as to produce an extruded lather having a density of from about 0.05 to about 0.15 g./cc., and preferably from about 0.06 to about 0.10 g./cc.

The pressurized compositions of the invention can be prepared in any suitable manner. One satisfactory method comprises admixing stearic acid, and if desired, coconut fatty acid with water and adding triethanolamine, in an amount sufficient to react with said acid or acids, and heating to about 80° F., thus forming the desired soaps in situ. The ethyl alcohol and any other desired additives are then added, and the resulting mixture is then transferred to a pressure container which is subsequently sealed. Thereafter the propellant can be added through a valve or other appropriate means.

In order to illustrate even more fully the nature of the present invention the following specific examples are set forth. It is to be understood that these examples are presented for illustrative purposes only and are not intended to limit the scope of the present invention in any manner. The percentages given are by weight unless otherwise indicated.

EXAMPLE 1

A number of compositions were formed by admixing triethanolamine stearate, triethanolamine coconut fatty acid soap, glycerol, ethyl alcohol and water. While the amounts of triethanolamine stearate, triethanolamine coconut fatty acid soap and glycerol were maintained constant, respectively, at 8%, 2% and 5% of the aqueous solution, the amount of ethyl alcohol in each composition was varied. The resulting compositions were pressurized and the viscosity of foams extruded therefrom were measured. The results were as follows:

| Composition No. | Ethyl alcohol content (percent) | Viscosity of foam (cps.) |
| --- | --- | --- |
| 1 | 0 | 7,200 |
| 2 | 10 | 14,000 |
| 3 | 20 | 17,600 |
| 4 | 25 | 16,500 |
| 5 | 27.5 | 18,600 |
| 6 | 30 | 18,000 |
| 7 | 35 | 2,000 |

It is apparent from the above viscosity values that the compositions of the present invention (Nos. 2, 3, 4, 5 and 6) produce firm rich lathers which, due to the inherent properties of the ethyl alcohol, have cleansing, astringent and disinfecting values. It is surprising to note that the addition of ethyl alcohol in the amounts disclosed in the present invention leads to the formation of foams which are substantially firmer than those produced when no ethyl alcohol is used. It is equally surprising to note that if ethyl alcohol is used in an amount slightly outside the upper limit of the range disclosed in the present invention, the resulting foams lack body and consistency and would be commercially unacceptable.

EXAMPLE 2

In order to demonstrate the unique properties of the triethanolamine soaps in forming rich, stable lathers in combination with ethyl alcohol, compositions substantially analogous to those of Example 1 were prepared, using potassium soaps instead of triethanolamine soap. Therefore, the present compositions contained potassium stearate, potassium coconut fatty acid soap and glycerol in concentrations of 8%, 2% and 5%, in combination with variable amounts of ethyl alcohol. Evaluation of the foams produced by the present compositions gave the following results:

| Composition No. | Ethyl alcohol content (percent) | Viscosity of foam (cps.) |
| --- | --- | --- |
| 1 | 0 | 5,000 |
| 2 | 5 | 2,800 |
| 3 | 7.5 | 2,400 |
| 4 | 10 | 2,000 |
| 5 | 12.5 | 2,000 |
| 6 | 15 | 2,200 |
| 7 | 20 | 1,400 |

The above results show that the addition of even minor amounts of ethyl alcohol destroy the body and consistency of foams produced from potassium soaps, which are widely accepted for the production of pressurized foaming compositions. The unique, unexpected and surprising properties of the triethanolamine soap in the practice of the present invention is therefore apparent.

The compositions of the present invention are principally useful as pressurized medicated shaving cream compositions due to their ability to combine the wetting and softening action of shaving lathers with the disinfecting and stimulating properties of ethyl alcohol. However, it will be readily apparent to one skilled in the art that the present compositions can also be advantageously used as skin cleansers or stimulants or for any other purpose in which it is desirable to combine the cleasing effect of soaps with the stimulating and medicating effects of an alcohol.

What is claimed is:

1. A composition in a pressure container, said composition being suitable and for forming a stable foam upon release from said container, said composition comprising an aqueous solution containing from about 6 to about 15 weight percent of the triethanolamine soap of stearic acid, from 0 to about 5 weight percent of the triethanolamine soap of coconut fatty acid, and from about 10 to about 30 weight percent of ethyl alcohol, said percentages being based on the weight of said solution; and a liquefied normally-gaseous propellant.

2. The composition of claim 1 wherein the weight ratio of the triethanolamine soap of stearic acid to the triethanolamine soap of coconut fatty acid is at least 2 to 1.

3. The composition of claim 1 wherein there is present from about 1 to about 10 weight percent, based on the weight of the aqueous solution, of glycerol.

4. A composition in a pressure container, said composition being suitable for forming a stable shaving lather upon release from said container, said composition comprising an aqueous solution containing, based on the weight of said solution, from about 7 to about 10 weight percent of the triethanolamine soap of stearic acid, from about 1 to about 3 weight percent of the triethanolamine soap of coconut fatty acid, the weight ratio of the triethanolamine soap of stearic acid to the triethanolamine soap of coconut fatty acid being at least 4 to 1, from about 2 to about 8 weight percent of glycerol, and from about 10 to about 30 weight percent of ethyl alcohol; and a liquefied normally-gaseous propellant.

References Cited

UNITED STATES PATENTS 2,655,480   10/1953   Spitzer et al. _____ 252—90
2,879,231   3/1959    Allen et al. _____ 252—90
2,908,650   10/1959   Fine _____ 252—90
3,131,152   4/1964    Klausner _____ 252—305

FOREIGN PATENTS 540,036   10/1955   Belgium.

HERBERT B. GUYNN, Primary Examiner

DENNIS L. ALBRECHT, Assistant Examiner

U.S. Cl. X.R.

252—118, 305